H. E. A. LANDSMAND.
RIM AND TIRE CONSTRUCTION.
APPLICATION FILED NOV. 16, 1921.
1,432,603.
Patented Oct. 17, 1922.
3 SHEETS—SHEET 1.
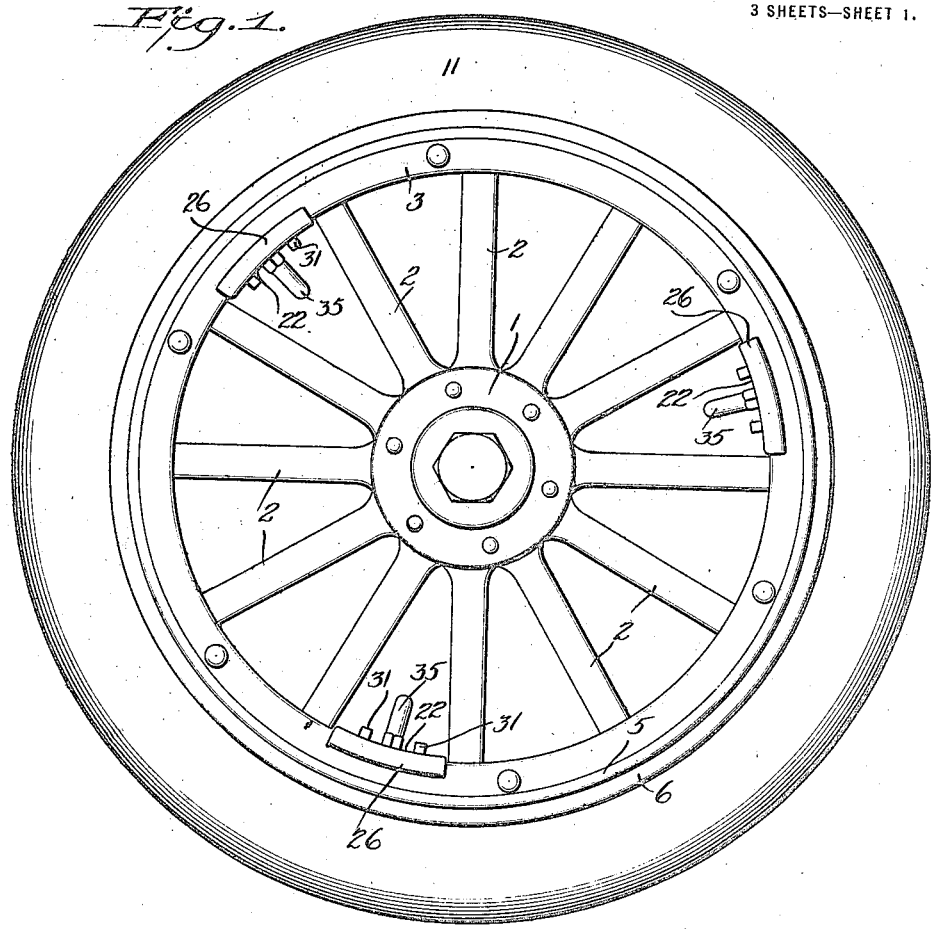
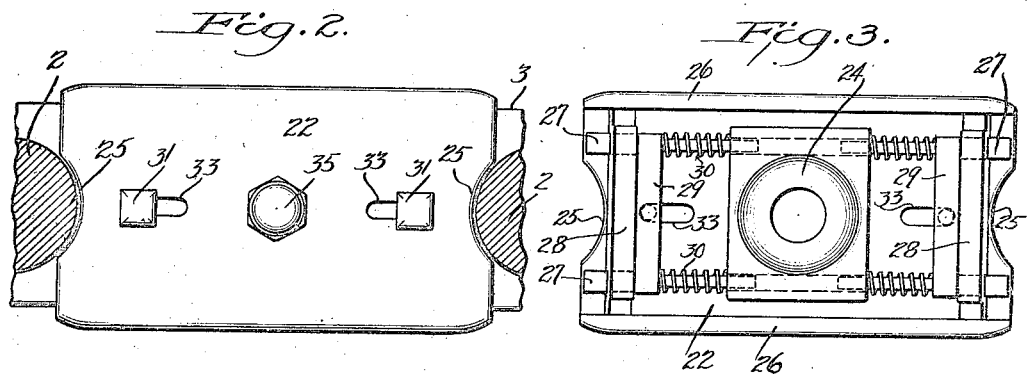
WITNESSES
INVENTOR
H.E.A. LANDSMAND
BY
ATTORNEYS

H. E. A. LANDSMAND.
RIM AND TIRE CONSTRUCTION.
APPLICATION FILED NOV. 16, 1921.

1,432,603. Patented Oct. 17, 1922.
3 SHEETS—SHEET 2.

WITNESSES
INVENTOR
H.E.A. LANDSMAND
BY
ATTORNEYS

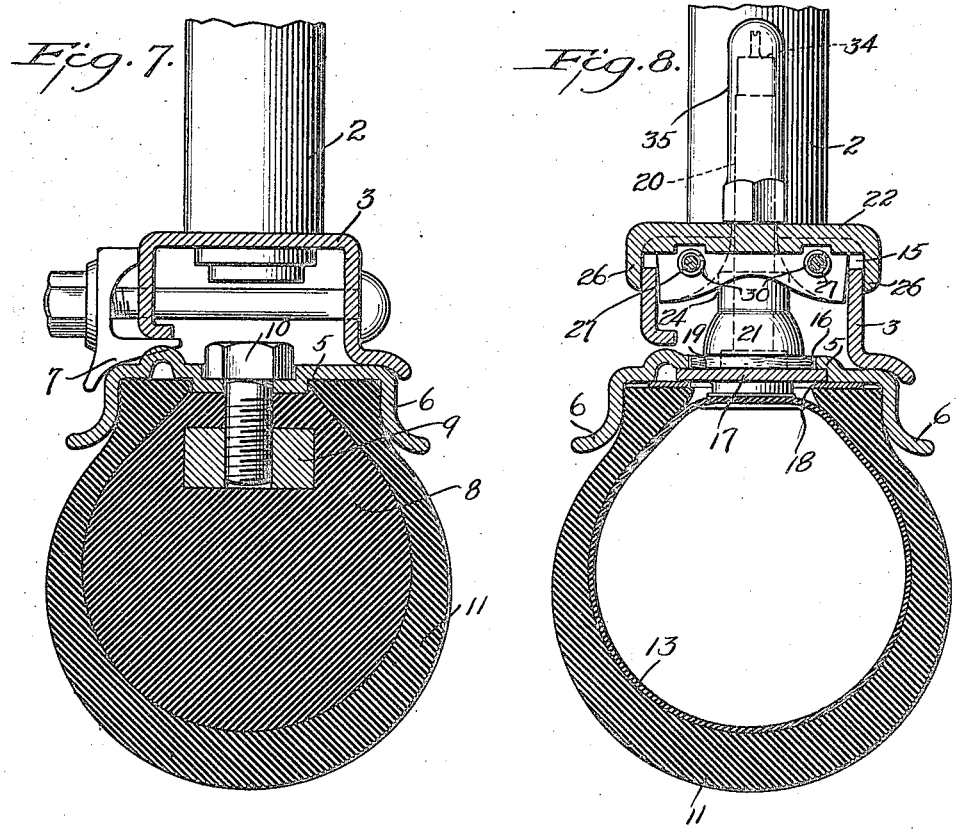
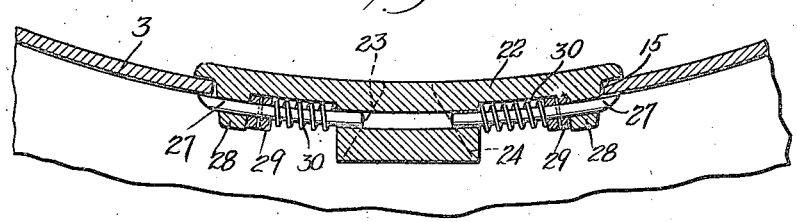
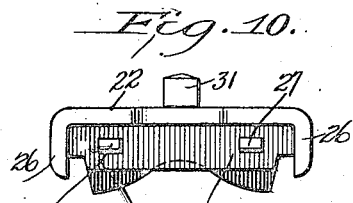

Patented Oct. 17, 1922.

1,432,603

UNITED STATES PATENT OFFICE.

HENRY E. A. LANDSMAND, OF HOBOKEN, NEW JERSEY.

RIM AND TIRE CONSTRUCTION.

Application filed November 16, 1921. Serial No. 515,589.

*To all whom it may concern:*

Be it known that I, HENRY E. A. LANDSMAND, a citizen of the United States, and a resident of Hoboken, in the county of Hudson and State of New Jersey, have invented a new and Improved Rim and Tire Construction, of which the following is a full, clear, and exact description.

This invention relates to improvements in the construction of automobile tires and rims, an object of the invention being to provide improved means permitting the changing of an inner tube without removing a tire from a rim or a rim from a felly.

To be more specific, an object of the invention is to provide a semi-pneumatic tire which uses a plurality of inner tubes, any one of which, may be removed and replaced without disturbing the position of the tire shoe on the rim.

A further object is to provide a rim and felly embodying certain novel features of construction which permit the rapid interchanging of tubes, and to provide a construction which will be simple and practical, and a tire and rim which will be durable and efficient in use, and which can be manufactured with comparative economy.

With these and other objects in view, the invention consists in certain novel features of construction and combinations and arrangements of parts as will be more fully hereinafter described and pointed out in the claims.

In the accompanying drawings:

Figure 1 is a view in side elevation of a wheel showing my improved construction;

Figure 2 is a plan view of one of the plates 22;

Figure 3 is a bottom plan view of this plate;

Figure 7 is an enlarged view in transverse section through the rim, felly, tire and one of the blocks on the line 7—7 of Figure 6;

Figure 8 is a similar view on the line 8—8 of Figure 4;

Figure 9 is a fragmentary view in longitudinal section showing the details of the plate; and Figure 10 is an end view of this plate.

Figure 4:
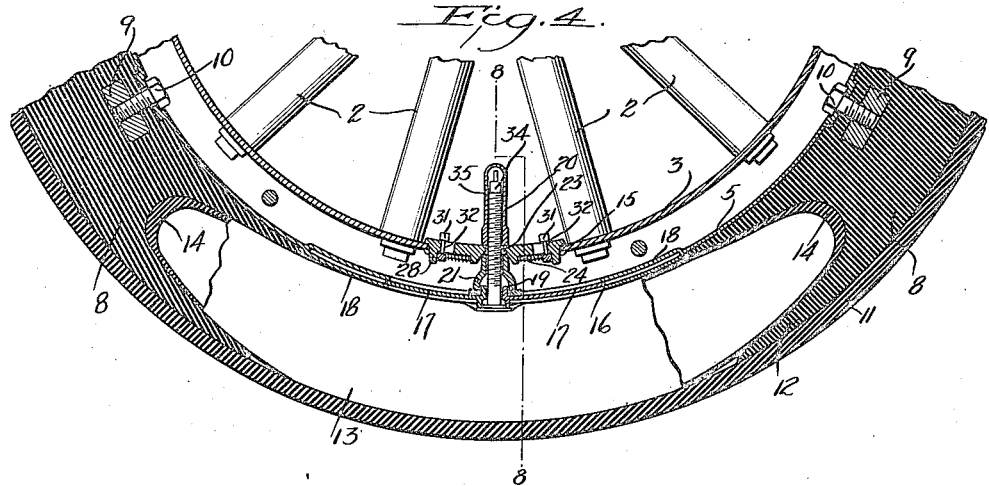
Figure 4 is a fragmentary view in longitudinal section through the tire, rim and felly.
Figure 5:
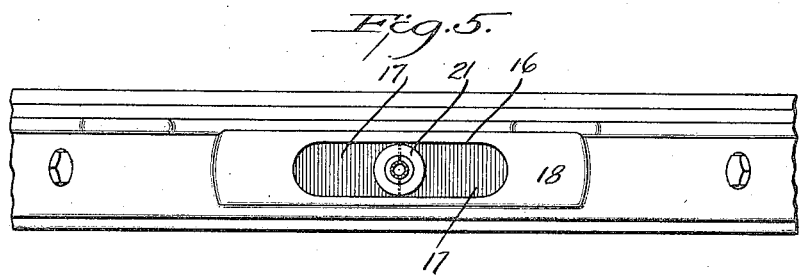
Figure 5 is a plan view of a portion of the inside of the rim.
Figure 6:
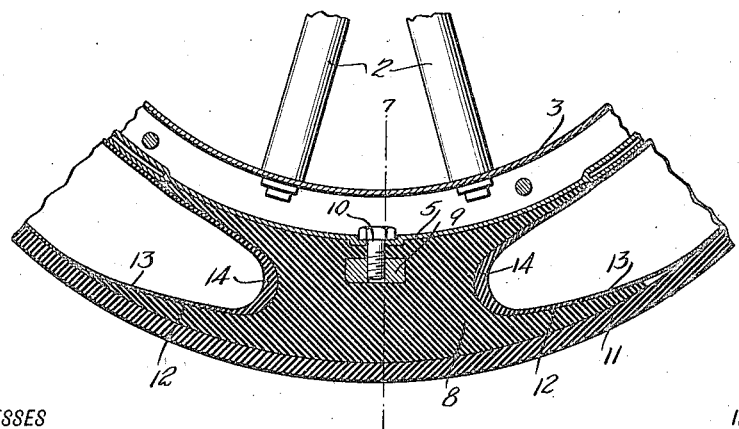
Figure 6 is a view similar to Figure 4 showing a complete block 8.

Referring in detail to the drawings, I have shown a wheel which includes a hub 1, spokes 2 and a conventional type of channeled felly 3. A rim 6 formed with tire holding flanges 6 is secured to the felly by the usual bolted-on lugs 7.

At spaced intervals around the rim, I provide rounded rubber cushions or blocks 8. The blocks 8 have embedded therein metal anchors such as 9 which are provided with screw threaded bores. Threaded bolts 10 passed through the rim 5 are screwed into these anchors to securely hold the blocks in place on the rim. The blocks are of such a shape that they conveniently fit a tire shoe 11 and at their opposite ends are formed with circular recesses or pockets 12 adapted to receive opposite ends of sections of tubes 13. It will be noted that the tubes 13 are reinforced at their ends, as indicated at 14, so that undue pinching of the blocks will not injure the same.

I have shown three blocks 8 within the shoe and three tubes 13 between the blocks, but it will be apparent that I need not necessarily limit myself to the exact number of tubes and blocks. The invention in this case resides primarily in the means which permit the removal and replacement of the tube without removing the tire shoe from the rim.

In carrying out the invention, openings such as 15 are formed in the base of the felly 3 between each pair of blocks 8. These openings are adapted to expose the rim 5. The rim 5 has formed therein openings 16 in direct alignment with the openings 15 in the felly, and the openings 16 are normally closed by a pair of sliding plates 17, sliding in guideways 18 integral with the rim. The meeting edges of the plates 17 are formed with opposed semi-circular recesses and flanges 19 are provided at the edges of the recesses. When the plates 17 are in closed position, the openings therein cooperate to form a passageway or opening which accommodates the stem or nipple 20 of a tire valve carried by the tube 13. After one of the tubes has been inserted into the shoe through the aligned openings in the felly and rim, the plates 17 are closed, the valve stem 20 projecting upwardly through the opening in the plates. A cup shaped holding member 21 is then slipped on over the valve stem and engages with the flanges 19 to hold the plates 17 against opening, as seen most clearly in Figure 4.

It will be obvious that I must also provide some means for closing the opening 15 in the wheel felly and with this end in view, a plate 22 is provided for closing the opening. This plate has a central opening 23 therein receiving the valve stem and immediately below the opening, the plate is formed with a depending socket 24 which receives the upper end of the holding member 21. The plate is recessed at its ends, as indicated at 25, to accommodate the adjacent spokes 2 of the wheel, and includes a pair of side flanges 26 embracing the sides of the felly to hold the plate against lateral movement.

Locking members 27 are mounted in suitable frames 28 for longitudinal sliding movement upon the under face of the plate. A pair of these members is provided at each end of the plate and each pair are connected by cross bars 29 acted upon by expansion springs 30 to normally project the locking members 27 under the adjacent edges of the felly and hold the plate against removal. The locking members may be manually operated against the action of the springs to release the same and permit the removal of the plate from the felly. In this connection I use handle members 31 carrying stems 32 which are movable in slots 33 in the plate and which are connected to the cross bars 29 on the under face of the plate. These handles may be pulled toward each other to disengage the locking members 27 and permit the removal of the plate from the felly.

After the plate 22 (or I should more properly say the plates 22 since the foregoing description of one plate applies to three of such plates which are provided with the three openings in the felly) has been positioned in place with the valve 20 projecting inwardly therethrough, the usual valve stem caps 34 and 35 are screwed onto the valve stem.

The operation of the device is as follows: In assembling, the tire shoe is first attached to the block carrying rim 5 and the rim is positioned in place on the felly. The several sections of tubes are introduced into the shoe through the aligned openings in the rim and felly, the plates 17 are closed and locked in the manner above described and the plates 22 are set in place and automatically locked by the spring held locking members 27. The tubes are then inflated in the usual manner until the air pressure therewithin is substantially the same or equivalent to the resiliency of the blocks 8. The caps 34 and 35 are screwed onto the valve stem and the wheel is ready for use. Should a blowout occur, a section of tube may be readily removed and replaced through the aligned openings in the rim and felly without removing the rim from the felly or the shoe from the rim.

Although I have illustrated one of the preferred embodiments of my invention, it will be evident that various slight changes and alterations might be made in the general form and arrangement of the parts described without departing from the invention, and hence I do not wish to limit myself to the precise details set forth, but shall consider myself at liberty to make such slight changes and alterations as fairly fall within the spirit and scope of the appended claims.

I claim:

1. The combination with a wheel felly, rim and shoe, of a plurality of resilient blocks carried by the rim and located within the shoe, pneumatic elements located between the blocks within the shoe, said rim and felly having aligned openings therein permitting the removal of the pneumatic elements, and means normally closing each of said openings, together with means interposed between the two plates to prevent the opening of the lower plate before the opening of the upper plate.

2. The combination with a wheel felly, rim and shoe, of a plurality of resilient blocks carried by the rim and located within the shoe, pneumatic elements located between the blocks within the shoe, said rim and felly having aligned openings therein permitting the removal of the pneumatic elements, means normally closing said openings, said means including sliding plates associated with the rim, a detachable plate carried by the felly, said sliding plate presenting upwardly projecting flanges, and a member interposed between the plates normally engaging said flanges.

3. The combination with a wheel felly, rim and shoe, of a plurality of independent pneumatic tubes within the shoe, said rim and felly having aligned openings therein permitting the introduction of the tubes within the shoe, means normally closing said openings, said means comprising a plate having an opening therein to accommodate a valve stem, and spring held devices carried by the plate engageable with the felly to prevent accidental removal of the plate.

4. The combination with a rim and shoe, of a plurality of resilient blocks within the shoe carried by the rim, securing means for said blocks including anchor plates embedded in the blocks, said anchor plates presenting a threaded opening, and said resilient blocks presenting openings in alignment with said threaded openings, and bolts passing through the rim and the openings in the resilient blocks for engaging the anchor plates.

HENRY E. A. LANDSMAND.